United States Patent [19]

Decker et al.

[11] Patent Number: 5,604,430
[45] Date of Patent: Feb. 18, 1997

[54] SOLAR ARRAY MAXIMUM POWER TRACKER WITH ARCJET LOAD

[75] Inventors: Darwin K. Decker, Hacienda Heights; Donald L. Baxter, Redondo Beach; Oded Lerner, Torrance; Jeffrey D. Campbell, Hawthorne; Richard A. Rosenthal, Redondo Beach; Michael J. Cook, Garden Grove, all of Calif.

[73] Assignee: TRW Inc., Redondo Beach, Calif.

[21] Appl. No.: 322,122

[22] Filed: Oct. 11, 1994

[51] Int. Cl.⁶ .............. G05F 1/565; G05F 5/00; H02M 7/44; H02J 7/00
[52] U.S. Cl. ............................ 323/275; 323/906
[58] Field of Search .................. 323/267, 269, 323/275, 906

[56] References Cited

U.S. PATENT DOCUMENTS

| | | | |
|---|---|---|---|
| 3,435,328 | 3/1969 | Allen | 323/8 |
| 4,143,314 | 3/1979 | Gruber | 323/15 |
| 4,404,472 | 9/1983 | Steigerwald | 307/46 |
| 4,580,090 | 4/1986 | Bailey et al. | 323/303 |
| 4,604,567 | 8/1986 | Chetty | 323/299 |
| 4,649,334 | 3/1987 | Nakajima | 323/299 |
| 4,706,010 | 11/1987 | Callen et al. | 323/225 |
| 4,794,272 | 12/1988 | Bavaro et al. | 307/66 |
| 4,899,269 | 2/1990 | Rouzies | 363/41 |
| 4,920,309 | 4/1990 | Szepesi | 323/269 |
| 4,999,524 | 3/1991 | Williams et al. | 307/54 |
| 5,025,202 | 6/1991 | Ishii et al. | 320/32 |
| 5,027,051 | 6/1991 | Lafferty | 323/222 |
| 5,077,518 | 12/1991 | Han | 323/275 |
| 5,138,248 | 8/1992 | Vogt et al. | 323/275 |
| 5,161,097 | 11/1992 | Ikeda | 363/124 |
| 5,164,657 | 11/1992 | Gulczynski | 323/275 |
| 5,196,924 | 3/1993 | Lumelsky et al. | 358/32 |
| 5,233,287 | 8/1993 | Lenk | 323/268 |
| 5,268,832 | 12/1993 | Kandatsu | 363/95 |
| 5,394,075 | 2/1995 | Ahrens et al. | 323/906 |
| 5,414,238 | 5/1995 | Steigerwald et al. | 219/121.54 |

Primary Examiner—Robert Nappi
Assistant Examiner—Bao Q. Vu
Attorney, Agent, or Firm—Michael S. Yatsko

[57] ABSTRACT

A solar array maximum power point tracking system for regulating the power output of a solar array associated with a spacecraft. An on-board computer measures the bus voltage and current from the solar array and generates a power calculation of the solar array power output. The on-board computer applies a first reference signal to a remote error amplifier representative of an incremental change in the solar array power. Additionally, the solar array bus voltage is applied to the remote error amplifier such that the remote error amplifier senses the solar array bus voltage and generates an output voltage indicative of the change of the solar array power. The output voltage of the error amplifier is applied to a power processor unit. The output voltage from the remote error amplifier and the bus voltage are applied to a power stage within the power processor unit. The power stage generates an output current that is applied to an arcjet thruster. The output current is also applied to a transconductive circuit that converts the output current to a voltage so as to condition the input voltage to the power stage.

20 Claims, 3 Drawing Sheets

SOLAR ARRAY MAXIMUM POWER TRACKER WITH ARCJET LOAD

BACKGROUND OF THE INVENTION

1. Field of the Invention

This invention relates generally to a spacecraft system for converting solar array power into thruster power and, more particularly, to a spacecraft system that regulates the maximum power point output of a solar array so as to convert the maximum solar array power to a maximum usable current for a series of arcjet thrusters that maneuver the spacecraft.

2. Discussion of the Related Art

As is well understood, spacecrafts include a number of systems and loads that require a significant amount of power to be operated. For current spacecraft mission designs, multiple kilowatts of power is necessary to satisfy the requirements of the systems and loads. For this reason, spacecrafts usually incorporate one or more solar arrays consisting of photovoltaic cells that receive sunlight, and convert the sunlight to usable electrical power so as to enable the spacecraft to generate the necessary power to operate the spacecraft systems. One of the main spacecraft loads that will use the converted sunlight energy is the thrusters that maneuver the spacecraft. Thrusters are necessary propulsion devices of satellites and spacecrafts to provide such functions as orbit transfer, orbit adjustment, momentum management and station keeping. Other spacecraft loads include communication systems, heating systems, sensing systems, operating systems, etc.

The photovoltaic cells of a spacecraft solar array significantly degrade over the life of a spacecraft mission as a result of being exposed to the space environment. Consequently, the power that the solar array is able to generate is continually reduced through time. Further, the output power of the photovoltaic cells varies greatly with different temperatures. It is generally desirable to operate the spacecraft thrusters at or near the maximum solar array power output so as to use the most power available from the solar array power supply, and thus maintain the maximum thrust available to maneuver the spacecraft. By efficiently utilizing the power output of the solar array, spacecraft efficiency is increased so that less power is required for specific propulsion functions, and solar array size can be minimized.

For at least the above reasons, spacecrafts generally include a control mechanism that can track the maximum power output point of the solar array as it degrades with mission life and varies with temperature changes so that the thrusters operate at the maximum solar array voltage, and thus achieve maximum thrust efficiency and minimize solar array power to meet mission requirements. Accordingly, spacecrafts usually include a maximum power point tracking device that regulates the maximum power output of the solar array so as to effectively convert this power output to electrical energy usable by the propulsion system and loads of the spacecraft.

More support for utilizing a solar array maximum power point regulator can be gleaned from an analysis of FIG. 1. FIG. 1 shows the current and voltage relationship of the output of a solar array associated with a spacecraft and a series of load line curves of a power processing unit (PPU) that conditions the power applied to an arcnet thruster of the spacecraft. An arcjet thruster is a plasma or an ion type thruster, well known to those skilled in the art, that is more particularly adapted to lengthy spacecraft missions. Because the arcjet thruster is an ion thruster, the PPU is required in order to convert the solar array power to an appropriate current useable by the arcjet thruster. The solar array output line is a constant power output of the solar array and each load line curve represents a constant power output of the thruster. Below a reference voltage $V_R$, the power output of the thruster is substantially linear and the power to the thruster is not regulated. When the voltage applied to the thruster reaches $V_R$, $V_R$ must be less than the available solar array current to obtain regulation. This condition is illustrated by the load line curve 1 where point A represents the only operating point of the system at the intersection of the solar array power output line and the load line curve 1.

As the PPU load power is increased, the PPU power is represented by the load line curve 2. The load line curve 2 has three possible operating points at the intersection with the solar array power output line. For the load line curve 2, the point C is an unstable operating point as a result of the negative resistance characteristics of the PPU and the high resistance of the solar array at that point. Although the point D is a stable operating point, it is on the non-regulation portion of the curve 2, and thus is a non-desirable operating point. The desirable operating point is point B for this power output so the power output can be regulated.

The load line curve 3 represents a higher PPU power curve than the load line curve 2. As is apparent, point E is the maximum power point of the solar array. Arcjet thrusters are unique in the fact that the current applied to the thruster needs to be limited to a certain maximum current level so as to prevent the thruster from collapsing and/or burning out. When an ion arcjet thruster collapses, it is necessary to restart the thruster from an initial start condition. Therefore, any increase in power from the load line curve 3 will cause the power output of the PPU to be reduced to the point F. In this condition, the system power demand needs to be reduced to the load line curve 1 to allow a desirable operating point on the solar array curve.

As is apparent from an analysis of FIG. 1 and the corresponding discussion, active electronic systems are needed to operate arcjet thrusters of a spacecraft at or near the solar array maximum power point. Exceeding the maximum power point may cause thruster shut down and require a new start up procedure. This condition results in loss of thrust and possible loss of spacecraft control. Therefore, without active electronic control systems, the thrusters must be operated at a safe margin away from the maximum power point of the solar array. This margin can be considerable since an arcjet thruster is a noisy load, and the solar array maximum power point varies with temperature and mission life.

U.S. Pat. No. 4,794,272 issued to Bavaro et al., herein incorporated by reference, discloses a number of maximum power point tracking schemes for use in tracking the maximum power output of the solar array of a spacecraft. In the background discussion of Bavaro et al., a number of prior art solar array power regulators are disclosed that take advantage of analog processing, digital processing, or a priori techniques with respect to a known reference voltage. The analog processing technique involves a trial and error method that is based on the output power of the solar array being a continuous function of voltage and current with a single peak power point. The digital processing technique utilizes analog sensors and digital computers for performing the same type of function as the analog processing system. The a priori technique utilizes tests of solar arrays representing a regulated solar array so as to predict the peak power point of the regulated solar array.

The main portion of the Bavaro et al. patent is concerned with a power regulator that adjusts the operating point of a solar array and a battery as a function of the sensed output current of the particular power source. The regulator determines whether the battery is properly charging. If the battery is in an undercharging condition, the solar array operating point is adjusted so as to minimize the undercharge current. If the battery is in a charging condition, the operating point of the solar array is again adjusted so as to continue battery charging according to a predetermined charging scheme. The Bavaro et al. system requires determining phase changes in the output power of the solar array. Further, the Bavaro et al. system can only operate at the maximum power point of the solar array, and thus is not adaptable for operating at a power level that can be manipulated as desired.

A system 10 of a basic prior art approach for tracking the maximum power point of a solar array that could incorporate the schemes mentioned above is shown by a schematic block diagram in FIG. 2. Solar array power from a solar array 12 is processed through a series component referred to as a maximum power point tracker (MPPT) 14. The MPPT 14 is a control device that measures either deviation of the solar array power from the maximum power point of the solar array or the derivative of solar array power with respect to voltage of the power output signal from the solar array 12. Once the MPPT 14 finds the maximum power point of the solar array 12, the MPPT 14 uses a dithering process to maintain the output power of the MPPT 14 at this value regardless of variations in the solar array 12. As the MPPT 14 searches for the maximum power point of the solar array 12, the MPPT 14 will measure the voltage output of the solar array 12 to search for the maximum voltage from the solar array 12 in a perturbing manner. To accomplish this, the MPPT 14 must also determine either the time or phaseshift of the search reversal, or produce an output proportional to a searched error signal, depending on the type of system being used. Some systems also require that the MPPT 14 match the impedance of the solar array 12 with the impedance of the loads.

The maximum power value from the solar array 12 is transferred from the MPPT 14 to a power switching and logic circuit 16. The power switching and logic circuit 16 is a switching circuit that transfers the power from the solar array 12 to the spacecraft loads. Particularly, power from the solar array 12 is transferred through the power switching and logic circuit 16 to thrusters 18 for maneuvering the spacecraft. A propulsion powered conditioning circuit 20 converts the power signal from the solar array 12 to a form useable by the thrusters 18, as is well understood in the art. Also, solar array power is transferred through the power switching and logic circuit 16 to a variable power load 22. The variable power load 22 represents those spacecraft loads that require a different voltage than is provided by the voltage output of the power switching and logic circuit 16. Additionally, power from the solar array 12 is also applied through the power switching and logic circuit 16 to other spacecraft loads 24 through a spacecraft power conditioning circuit 26.

As is well understood in the art, the spacecraft loads may require more power than is able to be produced by the photovoltaic cells of the solar array 12 even when the MPPT 14 is operating at the maximum power point. Such times may occur when the photovoltaic cells of the solar array 12 are being eclipsed by some object, as would occur when the spacecraft travelled behind a planet or the like. Additionally, the solar array 12 may be designed to not be able to provide the necessary power when all or most of the spacecraft loads are operating simultaneously. For this reason, a spacecraft will include a battery 28 to augment the power output of the solar array 12. As is apparent, the output of the battery 28 is applied to the power switching and logic circuit 16, and thus, the battery power is distributed to the spacecraft loads in the same manner that the power from the solar array 12 is distributed. At times when the solar array 12 is capable of providing the power necessary to operate the spacecraft loads, the solar array power is also available to charge the battery 28 through the power switching and logic circuit 16 so as to maintain the power level of the battery 28 at a maximum capacity for times when the solar array 12 is unable to provide the necessary power to the spacecraft loads.

One of the greatest concerns when designing the systems necessary to operate a spacecraft is to limit the spacecraft weight as much as possible. For every reduction of weight of the spacecraft operating systems, greater payload capabilities can be realized with the same fuel requirements so as to increase the effectiveness for a particular mission. For example, the MPPT 14 and the battery 28 weigh hundreds of pounds in a multikilowatt spacecraft power system. Additionally, these elements add significantly to the overall cost of the spacecraft system 10. For certain kinds of spacecraft missions, such as interplanetary travel, the solar array 12 is generally capable of providing the power necessary to operate the spacecraft loads at all times. Therefore, it is possible to either eliminate the battery or significantly reduce the size of the battery.

From the discussion above, it is clear that it would be highly advantageous, especially in long term space travel missions, to eliminate the weight and expense of a maximum power point tracking device and battery in known spacecraft power systems. It would also be advantageous to provide a system that effectively tracked the maximum power point of a solar array so as to provide maximum current to an arcjet thruster. It would further be advantageous to provide a system that was capable of operating at any power point along the power output of the solar array. It is therefore, an object of the present invention to provide these advantages.

SUMMARY OF THE INVENTION

In accordance with the teachings of the present invention, a solar array maximum power point tracking system associated with a spacecraft that is particularly adaptable to be used with an arcjet thruster is disclosed. An on-board computer associated with the tracking system measures the bus voltage and current from a solar array of the spacecraft. The on-board computer calculates the solar array power from the bus voltage and current, and applies a first reference signal representative of an incremental change in the solar array power to a remote error amplifier. Additionally, the solar array bus voltage is applied to the remote error amplifier such that the remote error amplifier senses the solar array bus voltage and generates an output voltage indicative of the change of the solar array power from the on-board computer. After each change of the solar array power, the on-board computer provides updated reference signals from updated solar array power calculations as it searches for the maximum solar array power output.

The output voltage from the remote error amplifier is applied to a series of power processor units. Within each power processor unit, the output voltage of the remote error amplifier is applied to a summing junction. An output voltage signal from the summing junction is applied to a power stage within the power processor unit where the power stage also receives the bus voltage. The power stage generates an output current to drive an arcjet thruster. The output current of the power stage is also applied to a transconductive circuit that converts the current to a voltage value. The voltage value from the transconductive circuit is applied to the summing junction in the power processor unit so as to modify the output of the remote error amplifier in order to limit the current output of the power stage. Additionally, a second reference signal from the on-board computer is applied to the summing junction in the power processor unit in order to provide a turn on and turn off point by which the on-board computer can control all of the arcjet thrusters in a sequencing manner.

Additional objects, advantages, and features of the present invention will become apparent from the following description and appended claims, taken in conjunction with the accompanying drawings.

DETAILED DESCRIPTION OF THE PREFERRED EMBODIMENTS

The following discussion of the preferred embodiments concerning a power regulator and a maximum power point tracking system for a spacecraft is merely exemplary in nature and is in no way intended to limit the invention or its applications or uses.

Figure 3:
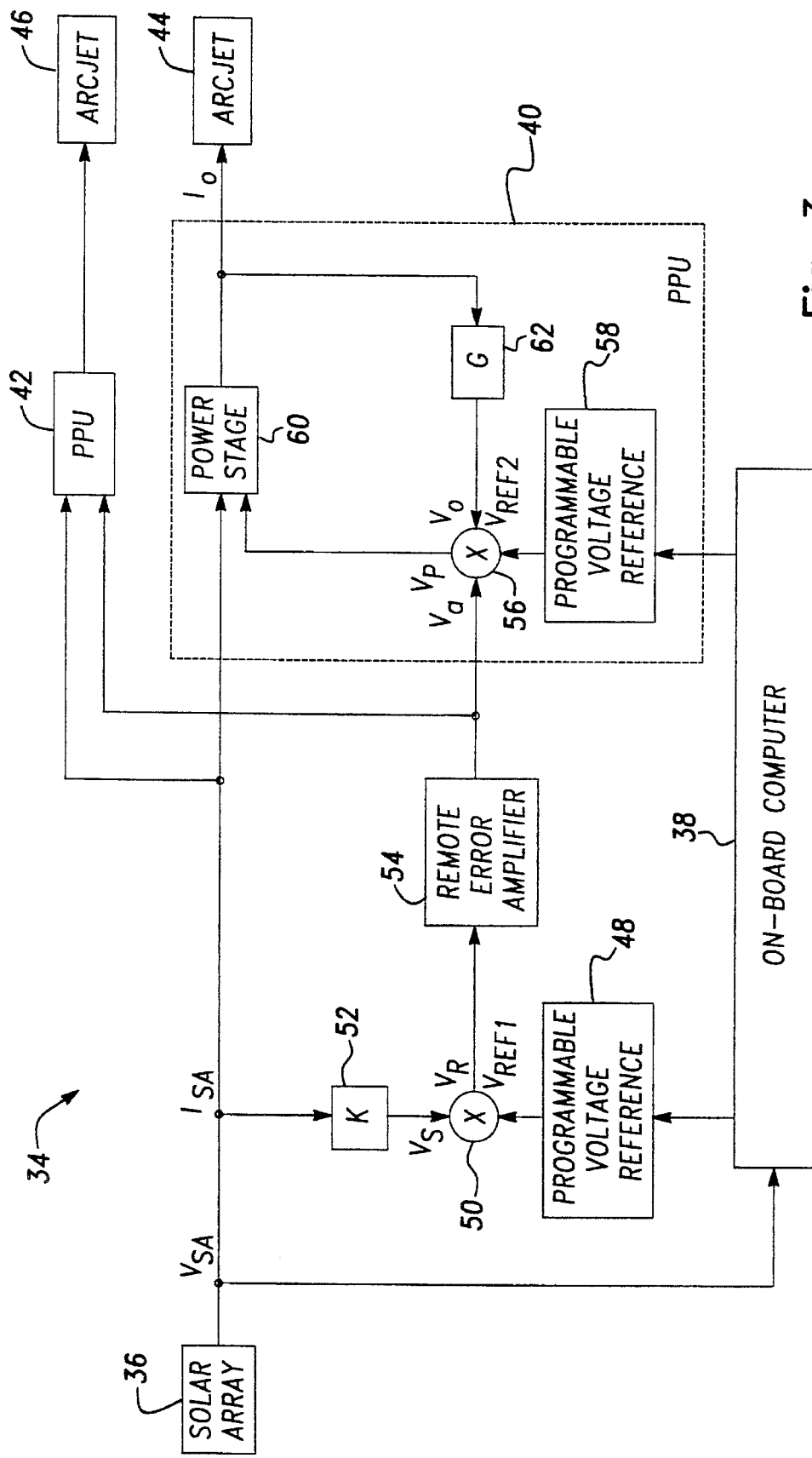
FIG. 3 is a schematic block diagram of a power system for tracking the maximum power point of a solar array associated with a spacecraft according to a preferred embodiment of the present invention.

FIG. 3 shows a schematic block diagram of a system 34 that regulates the power ($P_{SA}$) output from a solar array 36 associated with a spacecraft (not shown). A bus voltage $V_{SA}$ and bus current $I_{SA}$ output from the solar array 36 are applied to an on-board computer 38. Additionally, the bus voltage $V_{SA}$ and current $I_{SA}$ from the solar array 36 are applied to a first power processor unit (PPU) 40 and a second PPU 42. The PPU 40 is shown in detail as including a number of internal components, discussed below. It will be understood that the PPU 42 includes the same components, and thus, only the operation of the PPU 40 will be specifically addressed. Although only two power processor units and associated thrusters are shown in the system 34, it will be understood that a typical spacecraft or satellite will generally include eight such power processor units and associated arcjet thrusters. However, any reasonable number of power processing units are applicable without departing from the scope of the invention.

The PPU 40 conditions the power output from the solar array 36 and regulates the bus voltage $V_{SA}$ and the current $I_{SA}$ so as to provide an output current $I_o$ applicable to be used by an arcjet thruster 44. Likewise, the PPU 42 also receives the power output from the solar array 36 and regulates the bus voltage $V_{SA}$ and the current $I_{SA}$ to a form applicable to be used by an arcjet thruster 46. As mentioned above, arcjet thrusters are ion thrusters that have a maximum current operating point beyond which the thruster will collapse and turn off.

The on-board computer 38 measures the solar array bus voltage $V_{SA}$ and current $I_{SA}$ and calculates the solar array power $P_{SA}$ from these values ($P_{SA}=V_{SA}I_{SA}$). The on-board computer 38 applies the calculated solar array power to a peak power tracking (PPT) algorithm internal within the on-board computer 38 that will cause the load of the solar array 36 to be varied, and thus vary the power output of the solar array 36 as will be discussed in greater detail below. The PPT algorithm of the on-board computer 38 generates an output signal indicative of a change in the solar array power $P_{SA}$ to a programmable voltage reference circuit 48. The programmable voltage reference circuit 48 is a digital-to-analog converter circuit that generates a reference voltage $V_{REF1}$ indicative of a power change determined by the on-board computer 38. The voltage $V_{REF1}$ from the programmable voltage reference circuit 48 is then applied to a summing circuit 50.

The bus voltage $V_{SA}$ from the solar array 36 is also applied to a voltage divider circuit 52. The voltage divider circuit 52 reduces the bus voltage $V_{SA}$ from the solar array 36 to a proportional lower value $V_S$ that is a magnitude commensurate with the voltage values from the programmable voltage reference circuit 48. The voltage $V_S$ from the voltage divider circuit 52 is also applied to the summing circuit 50. The summing circuit 50 adds the voltage $V_S$ and $V_{REF1}$ and generates an output reference voltage $V_R$. The summing circuit 50 applies the reference voltage $V_R$ to a remote error amplifier 54 to amplify the voltage $V_R$ from the voltage divider 50 to an amplified voltage $V_a$. The remote error amplifier 54 also provides loop shaping and frequency response functions. The combination of the summing circuit 50, the voltage divider circuit 52 and the error amplifier 54 make up a solar array simulator unit. In the manner as discussed above, the solar array simulator unit senses the voltage output $V_{SA}$ of the solar array 36.

The voltage output $V_a$ from the remote error amplifier 54 is applied to the PPU 40 and the PPU 42. Within the PPU 40, the voltage $V_a$ is applied to a summing junction 56. The on-board computer 38 also provides a reference voltage signal to a programmable voltage reference circuit 58 within the PPU 40. The programmable voltage reference circuit 58 is also a digital-to-analog converter circuit that converts the digital signal from the on-board computer 38 to an indicative reference voltage $V_{REF2}$. The programmable voltage reference circuit 58 applies the voltage $V_{REF2}$ to the summing circuit 56 to provide a turn on reference point for the arcjet thruster 44. The reference voltage $V_{REF2}$ allows for sequencing of multiple PPUs and associated arcjet thrusters to accommodate varying thrust requirements of the spacecraft. In other words, if it is desirable to energize only certain thrusters in order to maneuver the spacecraft in a particular manner, the reference voltage $V_{REF2}$ can be used to either energize or shut off particular thrusters.

If the voltage $V_a$ is greater than the voltage $V_{REF2}$, then the summing circuit 56 generates an output voltage $V_P$ that is applied to a power stage 60 within the PPU 40. The power stage 60 combines the voltage signal $V_P$ from the summing circuit 56 and the bus voltage $V_{SA}$ from the solar array 36, and converts this signal to an appropriate output current $I_O$ applicable to be used by the arcjet thruster 44 in a manner well understood to those skilled in the art. A feedback portion of the $I_O$ current signal is applied to a transconductive circuit 62 that converts the current $I_O$ to a relative voltage $V_O$. The voltage value $V_O$ from the transconductive circuit 60 is applied to the summing circuit 56 so as to regulate the voltage $V_P$ applied to the power stage 60 in a manner that will appropriately limit the output current $I_O$ to prevent the thruster 44 from collapsing.

In accordance with the PPT algorithm, the on-board computer 38 will increment the signal applied to the programmable voltage reference circuit 48 so as to adjust the reference voltage $V_{REF1}$. When the voltage reference $V_{REF1}$ is changed, the voltage $V_R$ applied to the remote error amplifier 54 is adjusted accordingly. Likewise, the voltage $V_a$ from the remote error amplifier 54 applied to the summing circuit 56 is changed such that the output voltage $V_P$ of the summing circuit 56 adjusts the bus voltage at the power stage 60, and thus the load on the solar array 36. The on-board computer 38 will again calculate the power output of the solar array 36 after it has incremented the reference voltage $V_{REF1}$ to determine if the power output of the solar array 36 has increased or decreased. Once the on-board computer 38 determines if the power output of the solar array 36 has increased or decreased, the on-board computer 38 will cause $V_{REF1}$ to reduce $V_R$ if the power output has decreased, and to increase $V_R$ if the power output has increased. The system 34 will continue searching for the maximum or peak power output of the solar array 36 in this manner, and once the on-board computer 38 finds this maximum power point, it will dither the reference voltage $V_{REF1}$ about the maximum power point in order to maintain this power level. Therefore, as the output power of the solar array 36 drops as a result of degradation caused by the space environment, and as the output power of the solar array 36 varies with temperature of the solar array 36, the on-board computer 38 will calculate a change in the power output of the solar array 36, and will adjust the reference voltage $V_{REF1}$ accordingly such that the system 34 operates at the maximum power output of the solar array 36.

Figure 1:
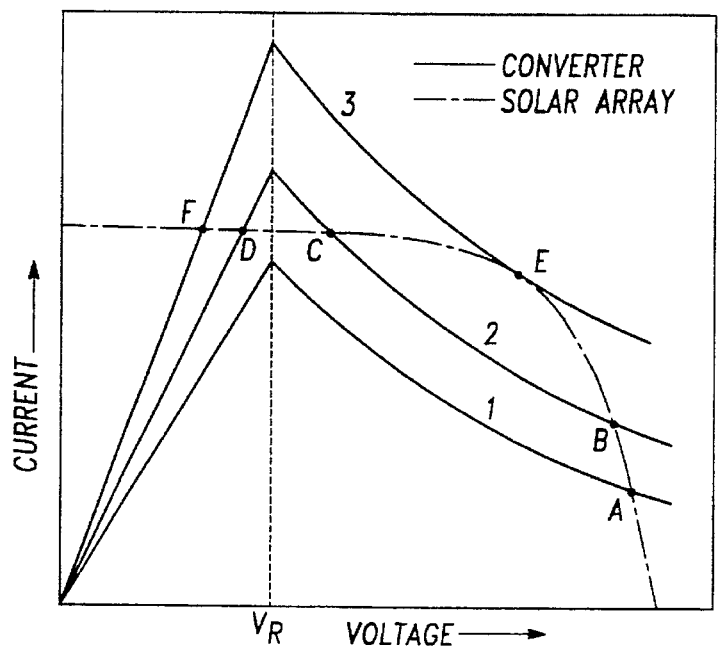
FIG. 1 is a graph of the voltage and current relationship of the output power of a solar array and the load of a power processor unit of a spacecraft.
Figure 2:
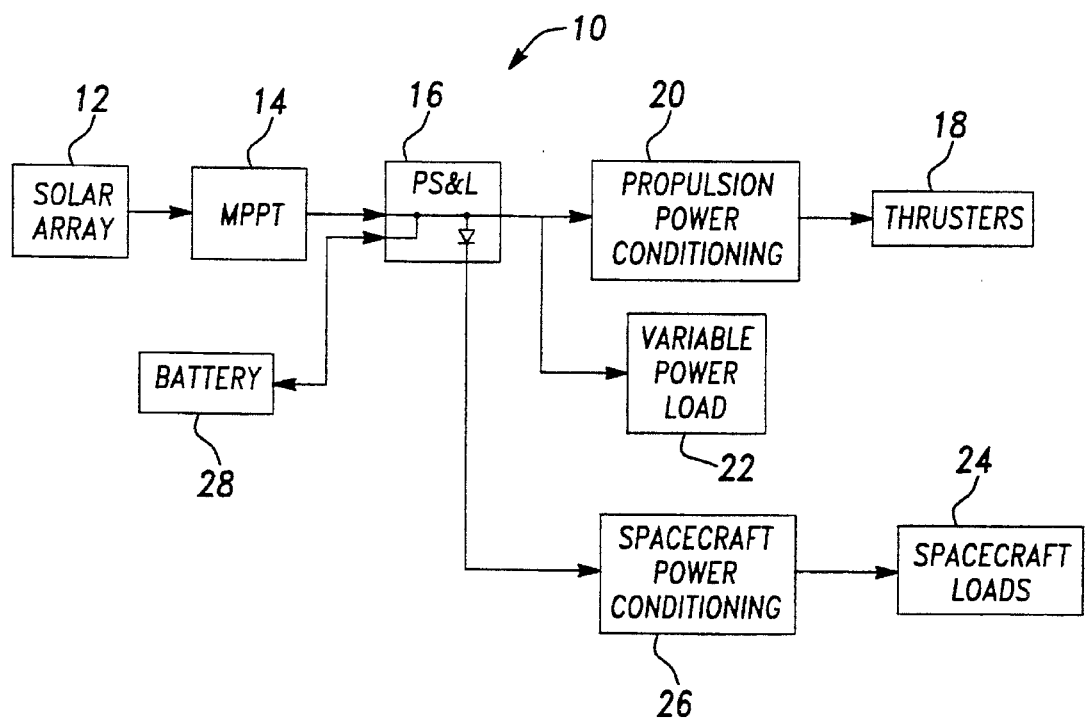
FIG. 2 is a prior art schematic block diagram of a power system that tracks the maximum power output of a solar array for a spacecraft.
Figure 4:
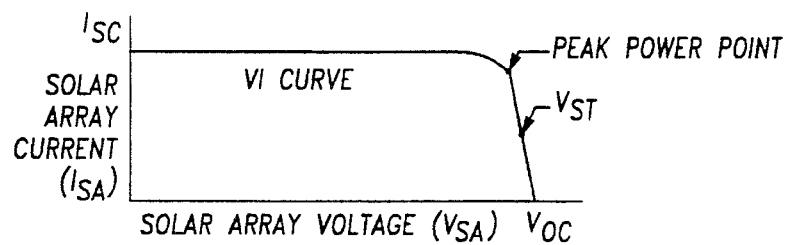
FIG. 4 is a graph showing the voltage/current curve of the solar array voltage and the solar array current output.

FIG. 4 is a graph that shows the relationship between the bus voltage $V_{SA}$ on the horizontal axis and the bus current $I_{SA}$ on the vertical axis. As is apparent, as the voltage output of the solar array 36 increases, the current output $I_{SA}$ remains substantially constant at $I_{SC}$ until the voltage approaches a maximum voltage $V_{OC}$ (the unloaded voltage of the solar array). At this point, the arcjet thruster 44 shuts down, and the current output $I_{SA}$ goes to zero. The peak or maximum power point that the system 34 attempts to operate at is shown at a point approximately where the output current begins to decrease. This is point E in FIG. 1.

The PPT algorithm does not attempt to regulate the maximum power point of the solar array 36 when the arcjet thruster 44 is first started. At start-up, the load of the arcjet thruster 44 is very unstable and nearly impossible for the PPT algorithm to track as a result of extreme temperature changes. Therefore, the system waits a predetermined time, such as 30 seconds, following arcjet start-up before the main algorithm allows the PPT algorithm to be initiated. During the 30 second time period before the PPT algorithm is initiated, other algorithms associated with the computer 38 monitor the bus power $P_{SA}$ of the solar array 36, and cause the start-up to be aborted if simulator power dissipation exceeds specified thresholds. After the 30 second start-up time period, the solar array output voltage $V_{SA}$ is set at 80% of the voltage $V_{OC}$. This point is labeled as $V_{ST}$ in FIG. 4. This provides a stable starting point to the right of the peak power point for the PPT algorithm to begin searching for the peak power point.

Figure 5:
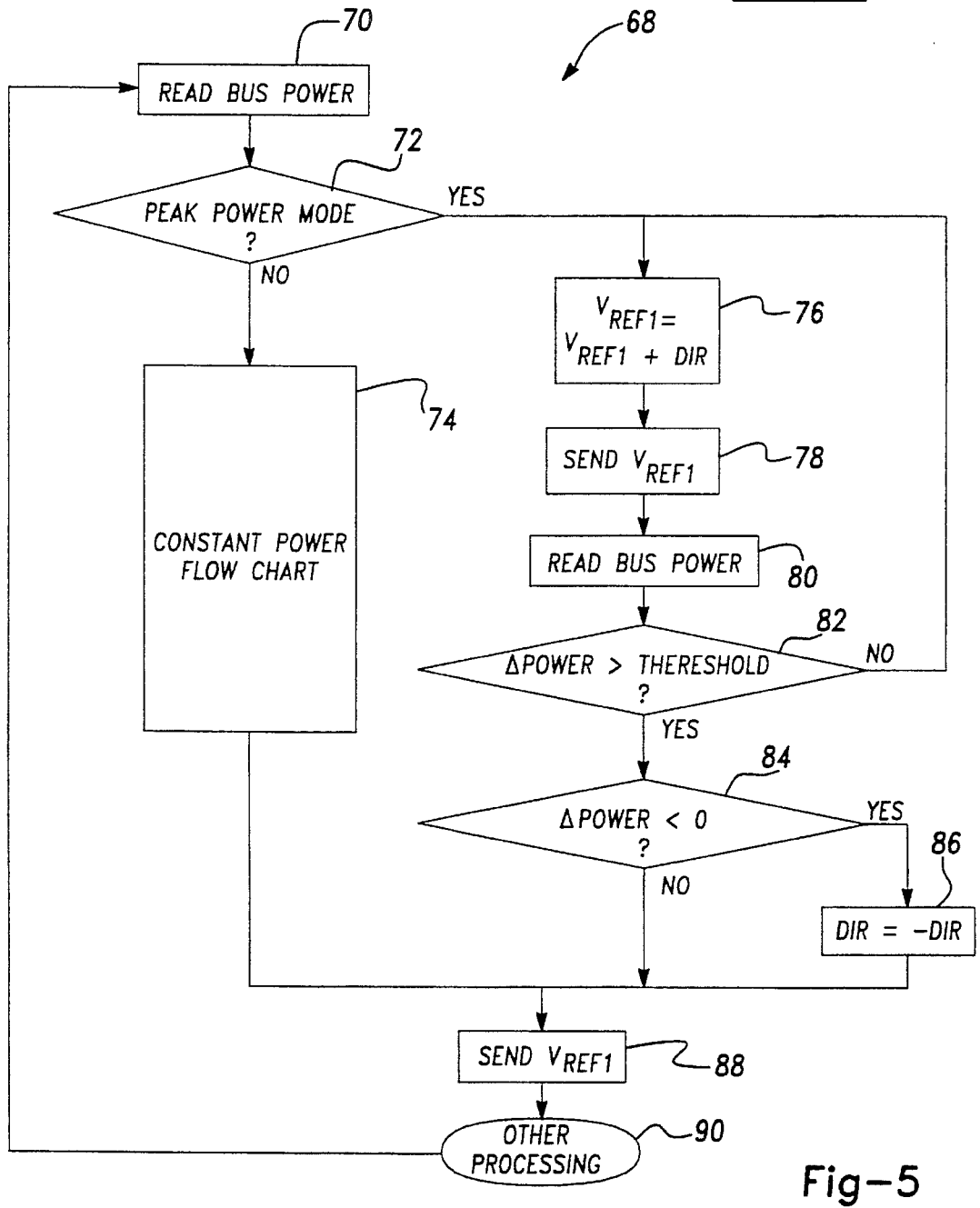
FIG. 5 is a flowchart diagram showing the processing steps of the algorithm for determining maximum power output.

FIG. 5 shows a flowchart diagram 68 depicting how the PPT algorithm seeks the peak power point of the solar array 36. The PPT algorithm makes one pass through the flowchart diagram 68 each time the PPT algorithm is called. When the PPT algorithm is initiated, the computer 38 will determine the solar array bus power $P_{SA}$ as represented by box 70. The PPT algorithm will then determine if the system is in a peak power mode or a constant power mode as represented by decision diamond 72. If the PPT algorithm determines that the system is in the constant power mode, then the PPT algorithm will maintain the output power of the solar array 36 constant as represented by box 74. The constant power mode is necessary for those times when changing the power output of the solar array 36 would be undesirable. The box 74 represents a sequence of algorithm steps for maintaining the output power of the solar array 36 constant when the system is in the constant power mode. The specifics of the constant power mode will not be discussed because this mode is beyond the scope of the maximum power point tracking of the invention.

If the PPT algorithm determines that the system is in the peak power mode, then the PPT algorithm will first cause the programmable voltage reference circuit 48 to either increase $V_{REF1}$ or decrease $V_{REF1}$ a predetermined incremental amount depending on the value of a direction flag (DIR) as represented by box 76. $V_{REF1}$ is changed by the on-board computer 38 the predetermined incremental amount each time the PPT algorithm comes to the step of the box 76. The value of the direction flag determines whether $V_{REF1}$ is increased or decreased the predetermined amount. When $V_{REF1}$ is increased or decreased, the load on the solar array 36 is changed, and therefore the power output of the solar array 36 should also change accordingly. In other words, if the direction flag reduces $V_{REF1}$, then the solar array power output should decrease, and if the direction flag increases $V_{REF1}$, then the solar array power output should increase. The on-board computer 38 will cause the programmable voltage reference circuit 48 to output the new $V_{REF1}$ so as to adjust $V_a$ being applied to the PPU 40 as represented by box 78. The PPT algorithm will also delay the next step of the algorithm a number of milliseconds so as to enable the hardware components of the system 34 to be stabilized to the new $V_{REF1}$ as also represented by the box 78.

The computer 38 will then measure the bus power again as represented by box 80. The PPT algorithm will then determine if the change in the solar array power output is above a predetermined threshold as represented by decision diamond 82. In one example, the threshold is 25 watts. If the change in the power output of the solar array 36 is not above the threshold value, then the PPT algorithm returns to the box 76 in order to again add or subtract the incremental voltage to the new $V_{REF1}$ in order to generate an updated $V_{REF1}$. Determining if the change in solar array bus power $P_{SA}$ is greater than a threshold amount is necessary in order to prevent the PPT algorithm from dithering around a fictitious local maximum in the voltage/current curve of FIG. 4 generated by noise and variations in the arcjet thruster load. The 25 watt threshold value can be altered depending on the amount of noise and load variations which the system must tolerate. If, however, the change in the output power of the solar array 36 does exceed the threshold value, the PPT algorithm determines if the change in the output power of the solar array 36 is greater or less than the power as determined by the computer 38 at the box 70.

If the power output of the solar array 36 has decreased, then the direction flag is inversed, as represented by decision diamond 86, so that the next time the PPT algorithm is initiated, the bus power at the box 70 will be reduced. The PPT algorithm will then send the new $V_{REF1}$ to the PPU 40 in the manner as discussed above, as represented by box 88. If the power output of the solar array 36 has not decreased, then the direction flag will stay the same, and the output of the decision diamond 84 will send the $V_{REF1}$ to the PPU 40 directly. An increase in the power of the solar array 36 indicates that the last direction change was in the correct direction, and therefore the direction flag is not changed. Therefore, the power output of the solar array 36 is moving closer to the peak power point. A decrease in the bus power indicates that the last change was in a direction away from the peak power point, and therefore the direction flag needs to be reversed. The system will then go through other processing algorithms as indicated by box 90 before it returns to the PPT algorithm and again reads the power of the solar array 36.

In this manner, by regulating the solar array voltage $V_{SA}$, the negative resistance characteristic of the PPU 40 is modified such that stable operation can be attained on either side of the solar array maximum power point. Thus, continuous thrust can be provided to the thruster 44 while seeking the maximum power operating point. Further, operation on the maximum power point can be obtained without collapsing to the non-regulating operating point as mentioned above.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A system for regulating power output from a solar array associated with a spacecraft, said system comprising:

calculating means for determining the power output of the solar array, said calculating means generating a reference signal, said reference signal being indicative of a power change of the solar array;

solar array simulator means for sensing the output of the solar array, said simulator means being responsive to a bus voltage signal from the solar array and the reference signal from the calculating means and generating an output signal representing a change in the power output of the solar array; and processor means for regulating the bus voltage from the solar array, said processor means being responsive to the output voltage signal from the solar array simulator means and the bus voltage signal from the solar array, said processor means combining the output signal from the solar array simulation means with the bus voltage signal from the solar array so as to generate an output signal that is applied to a spacecraft load, wherein the calculating means increments the reference signal a predetermined amount to either increase or decrease the reference signal depending on the direction of a direction indicator so as to cause the solar array simulator means to provide an updated output signal in order to operate the solar array at its peak power output point.

2. The system according to claim 1 wherein the calculating means determines whether the power output of the solar array has increased or decreased after the computer means has incremented the reference signal.

3. The system according to claim 2 wherein the calculating means inverses the direction indicator if the power output of the solar array has decreased.

4. The system according to claim 2 wherein the calculating means determines if the solar array power output has changed more than a predetermined threshold amount when the calculating means determines the power output of the solar array after the calculating means has incremented the reference signal, wherein if the solar array power output has not increased more than the predetermined threshold amount, the calculating means will cause the reference signal to be incremented the predetermined amount prior to the calculating means determining whether the power output of the solar array has increased or decreased.

5. The system according to claim 1 wherein the solar array simulator means includes a summing junction and an error amplifier, said summing junction being responsive to the bus voltage signal from the solar array and the reference signal from the calculating means, said summing junction applying an output signal to the error amplifier.

6. The system according to claim 1 wherein the processor means is a power processor unit, said power processor unit including a power stage, a summing circuit, and a transconductive circuit, said summing circuit being responsive to the output signal from the solar array simulator means and an output signal from the transconductive circuit and providing an output signal to the power stage, said power stage being responsive to the output signal from the summing circuit and the bus voltage signal from the solar array, said power stage generating the output signal applied to the load, said output signal also being applied to the transconductive circuit.

7. The system according to claim 1 wherein the spacecraft load is an arcjet thruster.

8. A system for regulating power output from a solar array associated with a spacecraft where the power output is applied to a thruster to maneuver the spacecraft, said system comprising:

an on-board computer, said on-board computer being responsive to a bus voltage signal and a current signal from the solar array, said on-board computer determining a power output of the solar array from the bus voltage signal and the current signal and generating a first reference signal indicative of a change in the solar array power output;

a remote error amplifier, said error amplifier being responsive to the bus voltage signal from the solar array and the first reference signal from the on-board computer and generating an output voltage signal representing a change in the output power of the solar array; and a power processor unit, said power processor unit being responsive to the output signal from the error amplifier and the bus voltage signal from the solar array, said power processor unit combining the output signal from the error amplifier with the bus voltage signal from the solar array so as to generate an output signal that is applied to the thruster, wherein the output signal from the remote error amplifier provides an adjustment of the solar array power output in an attempt to operate the solar array at its peak power output point.

9. The system according to claim 8 wherein the power processor unit includes a power stage that is responsive to the bus voltage signal from the solar array and the output voltage signal from the error amplifier, said power stage generating the output signal applied to the thruster.

10. The system according to claim 8 wherein the output signal of the power processor unit is applied to a transconductive circuit associated with the power processor unit, said transconductive circuit generating a voltage signal indicative of the output signal of the power processor unit, said power processor unit combining the voltage signal from the transconductive circuit with the voltage signal from the remote error amplifier prior to the voltage signal from the remote error amplifier being combined with the bus voltage signal from the solar array.

11. The system according to claim 10 wherein the power processor unit includes a summing circuit for summing the output voltage signal from the error amplifier and the voltage signal of the transconductive circuit, said summing circuit generating an output voltage signal that is applied to a power stage associated with the power processing unit to be combined with the bus voltage signal.

12. The system according to claim 8 wherein the computer means applies a second reference voltage to the power processor unit in order to shut off and turn on the output signal from the power processor unit so as to provide for sequencing of multiple power processor units.

13. The system according to claim 8 further comprising a voltage divider circuit and a summing circuit, wherein the bus voltage signal is applied to the voltage divider circuit and an output voltage signal of the voltage divider circuit is applied to the summing circuit, and wherein the first reference signal is applied to the summing circuit and is combined with the output voltage signal of the voltage divider circuit to be applied to the error amplifier.

14. The system according to claim 8 wherein the thruster is an ion type arcjet thruster.

15. A method of regulating power output from a solar array associated with a spacecraft wherein the power output is applied to a thruster to maneuver the spacecraft, said method comprising the steps of:

measuring the power output of the solar array;

generating an updated reference signal in response to the measured power output of the solar array, said update reference signal being indicative of a power change of the solar array, wherein the step of generating an updated reference signal includes incrementing an original reference signal a predetermined amount to either increase or decrease the original reference signal depending on the direction of a direction indicator;

combining the updated reference signal and a current bus voltage signal from the solar array in order to generate a modified reference signal representing a change in the power output of the solar array;

combining the modified reference signal with the current bus voltage signal;

generating an output signal that is based on the combination of the modified reference signal and the current bus voltage signal; and applying the output signal to the thruster, wherein the updated reference signal attempts to operate the solar array at its peak power output.

16. The method according to claim 15 wherein the step of generating an updated reference signal includes measuring the power output of the solar array to determine whether the power output of the solar array has increased or decreased after the step of incrementing the original reference signal.

17. The method according to claim 16 wherein the step of generating an updated reference signal includes inversing the direction indicator if the measured power output of the solar array has decreased.

18. The method according to claim 17 wherein the step of generating an updated reference signal includes the steps of determining whether the solar array power output has changed more than the predetermined amount after the step of incrementing the original reference signal such that if the solar array power output has not increased more than the predetermined threshold amount, the original reference signal will be incremented again the predetermined amount prior to the step of determining whether the power output of the solar array has increased or decreased.

19. The method according to claim 15 further comprising the step of combining the modified reference signal with the output signal in order to limit the output signal.

20. The method according to claim 16 wherein the step of generating an updated reference signal includes generating an updated reference signal that dithers the output power of the solar array around the maximum power output of the solar array.

* * * * *